United States Patent [19]

Lowell et al.

[11] Patent Number: 4,481,172

[45] Date of Patent: * Nov. 6, 1984

[54] PROCESS FOR REMOVAL OF SULFUR OXIDES FROM WASTE GASES

[75] Inventors: Philip S. Lowell; James L. Phillips, both of Austin, Tex.

[73] Assignee: Environmental Elements Corp., Baltimore, Md.

[*] Notice: The portion of the term of this patent subsequent to May 24, 2000 has been disclaimed.

[21] Appl. No.: 482,629

[22] Filed: Apr. 6, 1983

Related U.S. Application Data

[63] Continuation-in-part of Ser. No. 303,359, Sep. 18, 1981, abandoned.

[51] Int. Cl.$^3$ .......................... C01B 17/00; B01J 8/00; C01D 8/00
[52] U.S. Cl. .................................... 423/242; 423/166; 423/421; 423/422; 423/428
[58] Field of Search .......... 423/242 R, 242 A, 244 A, 423/244 R, 421, 422, 423, 428, 166

[56] References Cited

U.S. PATENT DOCUMENTS

| | | | |
|---|---|---|---|
| 3,846,535 | 11/1974 | Fonseca | 423/242 |
| 3,852,410 | 12/1974 | Rivers et al. | 424/242 |
| 3,962,410 | 6/1976 | Renault et al. | 423/423 |
| 4,164,543 | 8/1979 | Dezael et al. | 423/244 |
| 4,247,525 | 1/1981 | Voeste | 423/421 |
| 4,283,372 | 8/1981 | Frint et al. | 423/421 |
| 4,385,039 | 5/1983 | Lowell et al. | 423/242 |

Primary Examiner—Gregory A. Heller
Attorney, Agent, or Firm—Morton J. Rosenberg

[57] ABSTRACT

A process for removing sulfur oxides from waste gas is provided. The gas is contacted with an activated sodium carbonate sorbent and, utilizing an alkaline ammonia liquor so as to reduce the flow rates and loss of alkalinity, the spent sorbent is regenerated with an alkaline earth metal oxide or hydroxide.

8 Claims, 1 Drawing Figure

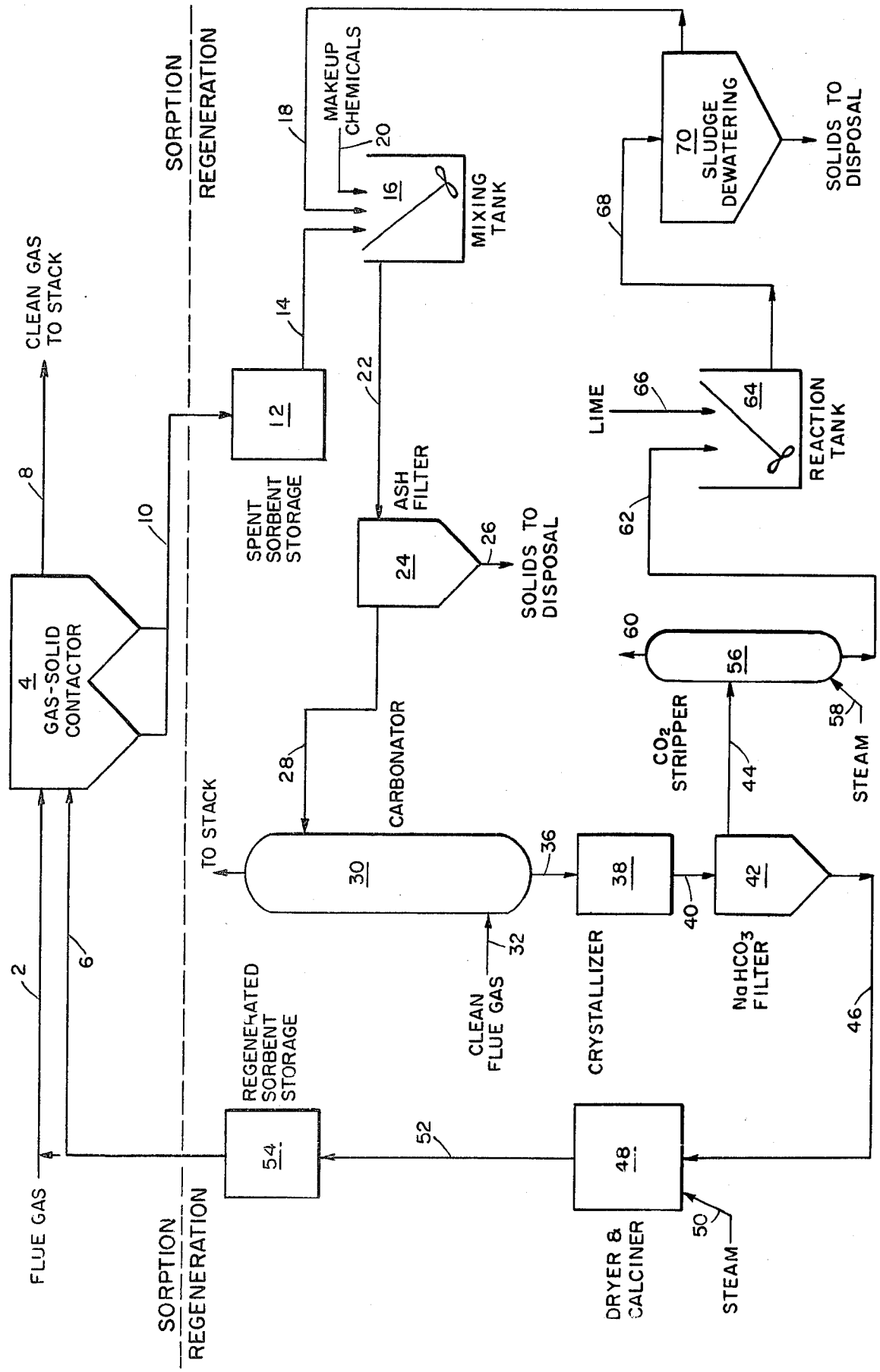

PROCESS FOR REMOVAL OF SULFUR OXIDES FROM WASTE GASES

CROSS-REFERENCE TO RELATED PATENTS

This is a continuation-in-part of U.S. Ser. No. 303,359 filed Sept. 18, 1981 now abandoned.

BACKGROUND OF THE INVENTION

This invention relates to a process for absorbing sulfur oxides from industrial waste gases with a solid sorbent and regenerating the solid sorbent for reuse.

In the combustion of fossil fuels, and in many industrial processes, a serious problem is presented by the combustion of the sulfur-containing components therein. The noxious sulfur oxides produced are an environmental pollutant and in recent years considerable effort has been made to remove the sulfur oxides from the combustion gases exhausted to the atmosphere. Several methods for removing such oxides are known. For example, U.S. Pat. No. 3,852,410 issued to Rivers et al., and U.S. Pat. No. 3,846,535 issued to Fonseca, are illustrative. To applicant's knowledge, however, all prior art processes have certain disadvantages and, consequently, an improved method for economically and reliably removing sulfur oxides from gaseous mixtures would be desirable, and is herein provided.

BRIEF SUMMARY OF THE INVENTION

Briefly, the process of the invention comprises treating the waste gas containing sulfur oxides (which is principally and hereinafter for convenience referred to as sulfur dioxide) with a solid activated sodium carbonate sorbent which can remove 90 percent or more of the sulfur dioxide. Trona is the mineral name for $Na_2CO_3 \cdot NaHCO_3 \cdot 2H_2O$. Activated sodium carbonate can be formed from sodium bicarbonate, trona or a mixture of the two, by calcining at a temperature between about 70° C. and about 200° C. For sodium bicarbonate having a characteristic particle dimension of about 50 microns, a calcination period of about 10 to about 30 minutes, at a temperature of about 150° C. will suffice. The clean gas is vented and the resultant unreacted solids, sodium sulfites, sulfates and mixtures thereof, are dissolved in a basic ammonia liquor that is alkaline enough to convert carbonic acid to bicarbonate, to form soluble sodium compounds. Carbonation of the resultant liquor forms a sodium precipitate containing bicarbonate, trona, or mixtures thereof.

The precipitate is separated from the carbonated liquor and the liquor treated with a precipitant compound selected from the class consisting of alkaline earth metal hydroxides, oxides and mixtures thereof to form insoluble alkaline earth metal sulfates, sulfites and mixtures thereof. Suitable alkaline earth metals include calcium, barium and strontium. After removing the solids, the liquor is recycled to treat spent sorbent.

The presence of ammonia in the process provides several distinct advantages. For one, it permits the use of lower flow rates in the regeneration loop of the process. Another important advantage is that since it does not degrade chemically or biologically to any significant extent, there is little loss of ammonia in the system, which accordingly reduces the amount of materials utilized in the process. Moreover, since the ammonia does not act as a reducing agent in the regeneration loop or in the solid waste disposal area the sulfites and/or sulfates present are not reduced to noxious sulfur compounds as, for example, hydrogen sulfide which can present serious health and disposal problems.

BRIEF DESCRIPTION OF THE DRAWING

The drawing is a schematic flow diagram of the process of the invention.

DETAILED DESCRIPTION OF THE INVENTION

Referring now to the drawing, a flue gas containing sulfur dioxide is fed via conduit 2 to a gas-solid contactor 4. Contactor 4, which can take many forms (e.g., fixed bed, moving bed, fluidized bed, etc.), is suitably a baghouse collector employing tube type fabric filter dust collecting surfaces preloaded with a suitable sorbent, which is introduced into contactor 4 via conduit 6. Alternately, the sorbent may be introduced into the gas stream upstream of the contactor. On passing through the contactor 4, the sulfur dioxide in the flue gas reacts with the sodium containing sorbent to produce sodium sulfite and sulfate, leaving a flue gas substantially free of any sulfur dioxide and which is vented from contactor 4 via conduit 8.

A solids product is removed from contactor 4 via conduit 10 and transferred to a spent sorbent storage vessel 12. At this point, the solids product will comprise unused sorbent initially in gas-solid contactor 4 plus soluble (sodium) sulfite and/or sulfate resulting from the reaction of the sorbent with the sulfur dioxide in the flue gas. The solids product is transferred to mixing tank 16 via conduit 14 where it is admixed with an alkaline recycle liquor containing ammonia from line 18 and makeup chemicals from conduit 20 which can include $NH_4Cl$, $(NH_4)_2SO_4$, $Na_2CO_3$, $Na_2SO_4$, NaCl, $NH_3$ or various mixtures of the above. In mixing tank 16, the soluble sulfite and/or sulfate which were formed by the reaction of the sulfur dioxide with the sorbent are dissolved. The liquor from mixing tank 16 is transferred via conduit 22 to a fly ash filter 24 where any fly ash is removed and disposed of via conduit 26. Conduit 26 may go to reaction tank 64 when not all of the sodium sulfite or sulfate from the spent sorbent storage vessel 12 dissolves in mixing tank 16. The fly ash free liquor leaves filter 24 via conduit 28, is introduced into carbonator 30, and is reacted with $CO_2$, introduced into carbonator 30 via conduit 32. Bicarbonate ions are formed which are transferred via conduit 36 to crystallizer 38 and converted to solid sodium bicarbonate which crystallizes out of solution. Excess $CO_2$ leaves carbonator 30 via conduit 34 for venting to the atmosphere or, if preferred, to the clean gas stack via conduit 8. The sodium bicarbonate and/or trona crystallized in crystallizer 38 is transferred via conduit 40 to sodium bicarbonate filter 42. Carbon dioxide may also be added to crystallizer 38 to drive the crystallization of sodium bicarbonate toward completion. The sodium bicarbonate recovered from filter 42 is transferred via conduit 46 to drier/calciner 48 where it is dried and calcined to an active form of sodium bicarbonate and transferred via conduit 52 to regenerated sorbent storage vessel 54. Alternatively, trona may be formed in crystallizer 38. It may be dried and calcined to an active form of sodium carbonate in drier/calciner 48 and transferred via conduit 52 to regenerated sorbent storage vessel 54. The carbon dioxide containing gas from the calciner may be added to crystallizer 38 or carbonator 30.

The liquid from filter 42 passes via conduit 44 into carbon dioxide stripper 56 where it is contacted counter-currently with a stripping gas (e.g., steam) introduced in the lower portion of stripper 56 via conduit 58. A portion of the $CO_2$, other undissolved gases and any remaining stripping gas is vented from stripper 56 via conduit 60. This $CO_2$ containing gas may be added to carbonator 30 or crystallizer 38. The $CO_2$ stripped liquor from stripper 56 is introduced, via conduit 62, into a reaction vessel 64 where it is contacted with precipitant, preferably lime, introduced via line 66. In reaction tank 64, the precipitant, e.g., lime, reacts with the soluble sodium sulfite and/or sulfate to produce insoluble calcium sulfate and/or calcium sulfite and regenerate the alkaline liquor. The mixture in reaction tank 64 is transferred via conduit 68 to a sludge dewatering vessel 70 where the insoluble calcium sulfate and/or sulfite is disposed of via conduit 72, the liquid from vessel 70 being recycled, as noted above, to mixing tank 16 via conduit 18.

As can be seen from the drawing, the process is comprised of two basic steps, a sorption step and a regeneration step. In the sorption step, the sulfur dioxide in the flue gas is contacted with the sorbent and converted into soluble sulfate and/or sulfite compounds. In the regeneration step or loop, the sulfur species is ultimately purged from the process as an insoluble sulfur compound and the sorbent is regenerated for reuse in the sorption step.

The sorbent is preferably a sodium carbonate obtained by calcining a sodium-containing compound such as sodium bicarbonate, trona or a mixture thereof at a temperature of from about 70° C. to about 200° C. It has been found that while sodium carbonate which has been produced by crystallization directly from solution does not act as an effective sorbent in the process of the present invention, calcined sodium carbonate produced by calcining sodium bicarbonate or trona, makes an excellent sorbent and is easily obtained by calcining the precipitated sodium bicarbonate produced in crystallizer 38.

To remove the soluble sulfites and/or sulfates from the system, a precipitant of an alkaline earth metal hydroxide, oxide or mixture thereof is employed. Thus, for example, the process can employ an oxide or hydroxide of calcium, barium or strontium or mixtures. The preferred alkaline earth metal is calcium.

As noted above with regard to the description of the drawing, the process, with advantage, employs a carbon dioxide stripper. The stripper, which can be any gas-liquid countercurrent contactor, serves to remove excess $CO_2$ from the process which would otherwise be precipitated as calcium carbonate in vessel 64, thereby increasing the use of lime in the process. The $CO_2$ stripper gas can include steam or an oxygen-containing gaseous medium such as, for example, air.

As pointed out above, the process of the present invention utilizes ammonia in the liquor in mixing tank 16. The ultimate source of alkalinity in the process is supplied by the precipitant (hereinafter for convenience referred to as lime) added to the reaction tank 64. However, without the use of some medium to transfer alkalinity from the solid phase (lime) to the liquid phase, the alkalinity of the solution would be rapidly depleted during the carbonation step. Accordingly, for a given circulation rate in the system, production of sodium bicarbonate in the carbonator would be greatly reduced. This would necessitate an increased pumping or recirculation rate in the system to the point where the process could become economically not feasible. The ammonia services the function of effecting the alkalinity transfer from lime to the liquid phase and can thus be considered an "alkalinity carrier". This alkalinity carrier has an acid form (ammonium ion) and a base form (ammonia), being in the base form as it leaves reaction tank 64. The clear liquid which is removed from ash filter 24 and which is used to dissolve the gas-solid contactor solids from contactor 4 is pumped to the carbonator 30 where the liquid phase alkalinity of the carrier is now exchanged for liquid phase bicarbonate alkalinity. This liquid phase bicarbonate alkalinity is now converted to the solid phase alkalinity of the sodium bicarbonate in the crystallizer. The alkalinity carrier in the clear liquid from crystallizer 38 is now in the acid form, i.e., ammonium ion. Upon entering reaction tank 64, the ammonium ion once again contacts the solid phase alkalinity provided by the lime, and is converted into the basic form (ammonia) and the cycle repeated.

It will be apparent that the alkalinity carrier can be added as the base, as ammonia, or in the acid form of its respective salts. Thus, for example, the ammonia can be added in the form of ammonium sulfate, ammonium chloride or the like via conduit 20, directly to the reaction tank 64, and via 28 to the carbonator tower.

The limits for ammonia may be determined from the following considerations. As an alkalinity carrier, it is desirable to maximize its concentration.

The limitation on ammonia concentration is the vapor pressure of ammonia. This is greatest at high temperature and pH. An upper limit is the total solution vapor pressure (water, ammonia, and $CO_2$) of the solution equal to five atmosphere absolute (60 psig).

The superiority of the invention sorbents can be seen from the following Tables 1 and 2 wherein Molar Volumes and Void Fractions are shown for the sorbents of the invention and comparison prior art compounds.

TABLE 1

| | Molar Volumes | | | |
|---|---|---|---|---|
| | | Density | | |
| Compound | Mol wt | $\frac{g}{cm^3}$ | Mols Na | $\frac{cm^3}{Mol\ Na}$ |
| $NaHCO_3$ | 84 | 2.20 | 1 | 38.2 |
| Trona* | 226 | 2.11 | 3 | 35.7 |
| $Na_2CO_3.H_2O$ | 124 | 2.25 | 2 | 27.6 |
| $Na_2CO_3$ | 106 | 2.533 | 2 | 20.9 |
| $Na_2SO_4$ | 142 | 2.66 | 2 | 26.7 |

*Trona is $Na_2CO_3.NaHCO_3.2H_2O$

TABLE 2

| | Void Fraction | |
|---|---|---|
| Starting | Void Fraction To | |
| Compound | $Na_2CO_3$ | $Na_2SO_4$ |
| $NaHCO_3$ | 0.453 | 0.301 |
| Trona | .415 | .252 |
| $Na_2CO_3.H_2O$ | .243 | .033 |
| $Na_2CO_3$ | .000 | −.278 |

In Table 1, the number of cubic centimeters occupied by one gram atom of sodium is given when in different compounds.

In Table 2, the void fraction is given for various materials which have decomposed or dehydrated to anhydrous $Na_2CO_3$ and then reacted with sulfur oxides to form $Na_2SO_4$. The solid volume fraction is determined by dividing the cm³/Mol Na for Na₂CO₃ (20.9) or for Na₂SO₄ (26.7) by the cm³/Mol Na for the compound for which the solid volume is desired. The void fraction is one minus the solid volume fraction. For example, the void fraction for trona which has been dehydrated to anhydrous Na₂CO₃ is $$1 - \frac{20.9}{35.7} = 1 - .585 = .415.$$

The data in Table 2 demonstrate a highly porous anhydrous $Na_2CO_3$ formed from $NaHCO_3$ and trona. The $Na_2CO_3.H_2O$ forms only a moderately porous $Na_2CO_3$.

The porous $Na_2CO_3$ reacts with sulfur oxides to form $Na_2SO_4$. When the initial material is $NaHCO_3$ or trona, the resulting solid is still porous. The crystal resulting from a $Na_2CO_3.H_2O$ starting material is essentially nonporous after reaction. With crystalline anhydrous $Na_2CO_3$, its volume is increased when reacted to form $Na_2SO_4$.

Thus with the activated sodium carbonate sorbents of the invention which are formed from sodium bicarbonate and trona have void fractions of between 0.35 and 0.5, gaseous diffusion carries sulfur oxides to the inner portion of the crystal. With sodium carbonate monohydrate a much slower and restricted diffusion is found. Reaction of the anhydrous material requires solid state diffusion and destruction of the original crystal. Consequently, the $Na_2CO_3$ produced from the decomposition of $NaHCO_3$ or trona is termed "active" with respect to sulfur oxide sorption.

The following examples will service to illustrate the preferred embodiment of the invention.

Example I

Flue gas containing 700 lb. mole/hr. of $SO_2$ is treated with 760 lb. mole/hr. of activated sodium carbonate and reacts with 90 percent of the sulfur dioxide in the flue gas. The resulting solids are collected in a baghouse. The solids from the baghouse are dissolved using 1350 gal./min. of a recirculated liquor containing 2.6 m ammonia and 6.5 m sodium, and other dissolved species such as chlorides, sulfites, sulfates, carbonates, calcium, etc. Also, makeup soda ash is dissolved into the liquor at the rate of 35.0 lb. mole/hr. The resulting liquor is then carbonated with 760 lb. mole/hr. of $CO_2$ from a combination of clean flue gas, and $CO_2$ recycled from other parts of the process. Excess $CO_2$ is combined with the cleaned flue gas. Makeup ammonia is also added to the liquor at a rate of 25.4 lb. mole/hr. in the carbonator tower. The resulting hot, carbonated liquor is cooled to 95° F. to precipitate 1520 lb. mole/hr. of sodium bicarbonate. The sodium bicarbonate solids are separated from the liquor, dried and calcined at 300° F. to form an activated sodium carbonate which is recycled to the baghouse to treat the flue gas. The separated liquor is passed through a $CO_2$ stripping column to remove 90 lb. mole/hr. of carbon dioxide from the liquor. The liquor leaving the $CO_2$ stripping column is treated with 660 lb. mole/hr. of lime in a reaction tank to precipitate calcium sulfite and/or calcium sulfate solids. These solids are separated from the slurry leaving the reaction tank and constitute the waste product. The separated liquor is recycled as noted above to dissolve the baghouse solids.

The following Example II, when run in accordance with the general procedure of Example I, but in the absence of an alkalinity carrier as indicated in the following table, demonstrate that the circulation rate would be increased at least a thousandfold (if even technically feasible) over the 1350 gpm circulation rate of Example I.

| Example | molality, moles/KgH₂O Ammonia | Circulation Rate gpm |
|---|---|---|
| II | 0 | 1,350,000+ |

While the foregoing description is illustrative of the preferred embodiments of the process of the invention, numerous obvious variations and modifications will be apparent to one of ordinary skill, and accordingly, it is intended that the invention be limited only by the appended claims.

What is claimed is:

1. A method for the removal of sulfur oxide from industrial waste gas containing same comprising:
    (a) contacting said gas with a solid activated sodium carbonate sorbent in an amount sufficient to react with substantially all of the sulfur oxide present in said gas to form solids of unreacted sorbent, sodium sulfite, sulfate, and mixtures thereof, and a waste gas substantially free of sulfur oxide;
    (b) venting the resultant waste gas from the process, dissolving said solids in an alkaline ammonia liquor defining an alkaline carrier to form soluble sodium compounds;
    (c) carbonating the resultant alkaline sodium liquor from step (b) and cooling to a temperature sufficient to form sodium bicarbonate or trona crystals;
    (d) separating the sodium bicarbonate or trona crystals from the liquor of step (c) and heating said bicarbonate and/or trona crystals for a time and at a temperature sufficient to form activated sodium carbonate, and recycling said activated sodium carbonate to step (a); and
    (e) removing carbon dioxide from the cooled liquor of step (c) by inserting said cooled liquor in a carbon dioxide stripper and contacting said cooled liquor with a stripping gas, adding a precipitant selected from the class consisting of alkaline earth metal hydroxides, oxides and mixtures thereof to the resultant liquor to render it alkaline and form insoluble solids comprising alkaline earth metal sulfates, sulfites and mixtures thereof, separating said solids and recycling the resultant alkaline liquor to step (b).

2. The method of claim 1 wherein said sorbent comprises activated sodium carbonate.

3. The method of claim 1 wherein said precipitant of step (e) comprises calcium oxide.

4. The method of claim 1 wherein said precipitant of step (e) comprises calcium hydroxide.

5. The method of claim 1 wherein ammonium sulfate or ammonium chloride is employed in step (b) to provide the ammonia.

6. The method of claim 1 wherein an activated sodium carbonate sorbent in step (a) is employed with a lime precipitant in step (e).

7. The method of claim 1 wherein $CO_2$ is added in the crystallization of step (c) to drive the crystallization of the sodium bicarbonate toward completion.

8. The method of claim 1 wherein $CO_2$ is added in the crystallization of step (c) to drive the crystallization of trona toward completion.

* * * * *